(12) United States Patent
Taplin, Jr.

(10) Patent No.: US 8,852,300 B2
(45) Date of Patent: Oct. 7, 2014

(54) LITHIUM CONDITIONED ENGINE WITH REDUCED CARBON OXIDE EMISSIONS

(76) Inventor: Harry R. Taplin, Jr., Thousand Oaks, CA (US)

(*) Notice: Subject to any disclaimer, the term of this patent is extended or adjusted under 35 U.S.C. 154(b) by 170 days.

(21) Appl. No.: 12/914,921

(22) Filed: Oct. 28, 2010

(65) Prior Publication Data

US 2012/0000449 A1 Jan. 5, 2012

Related U.S. Application Data

(60) Provisional application No. 61/361,323, filed on Jul. 2, 2010.

(51) Int. Cl.
*C10L 1/12* (2006.01)
*F23C 13/00* (2006.01)
*F23N 5/00* (2006.01)
*F23N 1/08* (2006.01)
*F23N 5/02* (2006.01)

(52) U.S. Cl.
CPC ............. *F23C 13/00* (2013.01); *F23N 2037/12* (2013.01); *Y02E 20/328* (2013.01); *F23J 2219/10* (2013.01); *F23N 5/003* (2013.01); *F23N 1/082* (2013.01); *F23J 2215/50* (2013.01); *F23N 5/022* (2013.01)
USPC ............................................. 44/457; 44/458

(58) Field of Classification Search
USPC .................................................. 44/457, 458
See application file for complete search history.

(56) References Cited

U.S. PATENT DOCUMENTS

| 3,951,613 | A | * | 4/1976 | Kiele .......................... 110/344 |
| 4,002,558 | A | | 1/1977 | Feldman |
| 4,612,880 | A | | 9/1986 | Brass et al. |
| 5,376,154 | A | | 12/1994 | Daly et al. |
| 6,858,047 | B1 | | 2/2005 | Norman |
| 2007/0256355 | A1 | * | 11/2007 | Cevallos et al. ................ 44/458 |

FOREIGN PATENT DOCUMENTS

| WO | WO/95/05665 | 2/1995 |
| WO | WO03/040269 | 5/2003 |
| WO | WO2007112456 | * 10/2007 |

OTHER PUBLICATIONS

"Analysis for Natural Gas & Similar Gaseous Mixtures by Gas Chromatograph", #2261, *Gas Processors Association*, 6526 E. 60th Street, Tulsa, OK USA 74145.

* cited by examiner

*Primary Examiner* — Cephia D Toomer
(74) *Attorney, Agent, or Firm* — Koppel, Patrick, Heybl & Philpott; Michael J. Ram

(57) ABSTRACT

This invention relates to an internal combustion engine combusting hydrocarbon fuel having a lithium conditioned combustion chamber for reduced carbon oxide engine emissions. The condition chamber is formed by combusting therein a hydrocarbon fuel containing a lithium salt.

6 Claims, 1 Drawing Sheet

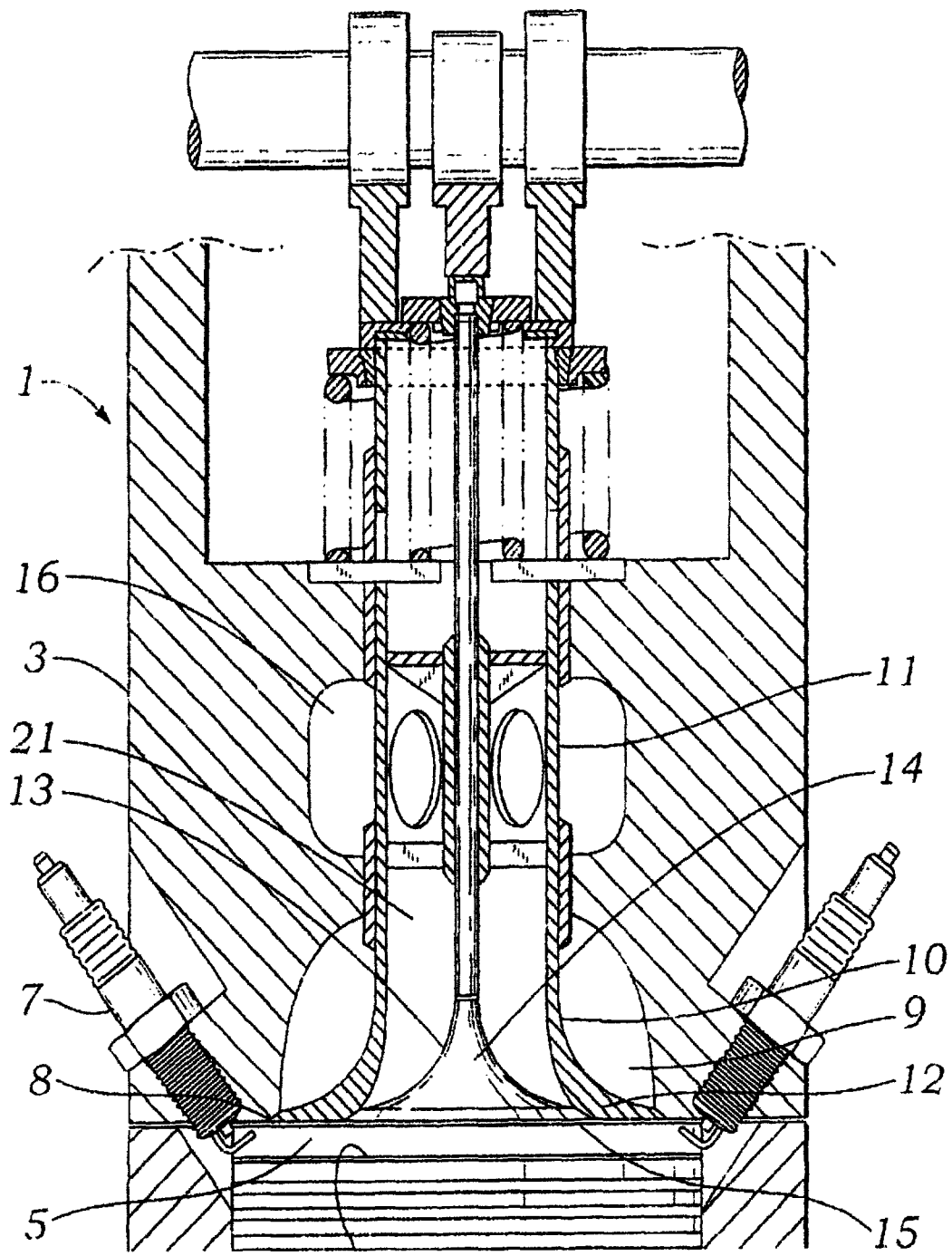

LITHIUM CONDITIONED ENGINE WITH REDUCED CARBON OXIDE EMISSIONS

Benefit is claimed of Provisional Application Ser. No. 61/361,323 filed Jul. 2, 2010.

BACKGROUND OF THE INVENTION

1. Field of Invention

An engine with reduced carbon oxide emissions is conditioned by the presence lithium during the combustion process of hydrocarbon fuel containing lithium followed by continued reduced carbon oxide emissions during the combustion process of hydrocarbon fuel without additional lithium. This invention also relates to a method of combusting a hydrocarbon fuel in a hydrocarbon powered engine having an internal surface conditioned by combusting a hydrocarbon fuel containing a lithium salt to provide a lithium conditioned surface, wherein the effluent gas has a lower concentration of carbon oxides than combusting the fuel under similar conditions in an engine not having a lithium conditioned surface.

The additive contemplated for use in the present invention includes lithium salts, specifically lithium nitrate, in organic solvents including isopropanol. Metallic salt additives to engine fuels have been reported to increase internal combustion engine efficiency and decrease vehicle gaseous emissions such as CO, $CO_2$, $C_6+$, and other compounds. These phenomena are not completely understood and are dependent on many parameters including the fuel chemical composition and interaction as well as exposed physical environment.

The engines contemplated for use in the present invention include the gasoline-powered internal combustion engines ignited by spark and also compression internal combustion (diesel) engines.

The emissions analyses contemplated for use in the present invention are defined by the Gas Processors Association "Analysis for Natural Gas & Similar Gaseous Mixtures by Gas Chromatography" #2261 is Incorporated by Reference. Compounds contemplated for use in the present invention include $CO_2$, $C_6+$, and $N_2$. Alkanes and other organic compounds are grouped together under unit measurement $C_6+$ hexanes. Carbon oxides are carbon and oxygen containing compounds COx, where x=1, 2 ... therefore, carbon monoxide and carbon dioxide are carbon oxides.

2. State of the Art

In the United States, the Environmental Protection Agency (EPA) regulates, monitors, and reports on many measurements of gases and chemicals used in vehicles. For example, the measurements may be reported by the EPA as: carbon content per gallon of gasoline, trends in carbon dioxide emissions, fuel economy, and technology usage, grams per mile, grams/mile values for total HC, CO, $CO_2$, $CH_3$, OH, HCHO, NMHC, $CH_4$, specific gravity, carbon weight fraction, net heating value, and natural gas. Monitoring and reduction of emissions of gaseous compounds by industrial applications is required by many government entities.

In order to comply with requirements in the Clean Air Act and California's Low Emission Vehicle/Clean Fuels Program, vehicle emissions are monitored and reduced. Additives may have beneficial effects on reducing vehicle emissions content including gasoline aromatics, olefin, sulfur, and carbon oxides. The United States Environmental Protection Agency, Transportation and Air Quality, monitors and regulates gasoline and diesel fuels. International, U.S. Government, and California policies and concerns focus on combustion efficiency and emissions of carbon oxides. Emission facts from the U.S. Environmental Protection Agency Code of Federal Regulations (40 CFR 600.113) provides values for carbon content per gallon of gasoline and diesel fuel used to calculate fuel economy of vehicles:

Gasoline carbon content per gallon: 2,421 grams

Diesel carbon content per gallon: 2,778 grams

The EPA summarized key trends in carbon dioxide emissions, fuel economy, and technology usage related to model year (MY) 1975 through 2009 light-duty vehicles sold in the United States. The first $CO_2$ emissions data are included in the EPA 2009 report. For model year 2009, EPA projects average real-world $CO_2$ emissions to be 422 grams per mile and fuel economy to be 21.1 miles per gallon. (Vehicles Light-Duty Automotive Technology, Carbon Dioxide Emissions, and Fuel Economy Trends: 1975 Through 2009, EPA-420-R-09-0 14, 1118-2009).

U.S. Environmental Protection Agency fuel economy calculation procedures are set forth in the Code of Federal Regulations Title 40, Volume 27, Part 600, Subpart B, Section 600.113-93 for all official EPA testing of motor vehicles fueled with gasoline, diesel, methanol or natural gas. The EPA Green Vehicle Guide scores cars and trucks based on tailpipe emission levels of CO, other major pollutants, and fuel economy. The EPA Greenhouse Gas Score reflects $CO_2$ emissions and is based on the vehicle fuel economy. As less fuel is burned, less $CO_2$ is emitted. The Greenhouse Gas Score varies by fuel type and is based on the carbon content of the fuel used and the fuel economy of the engine. City fuel economy and highway fuel economy from the grams/mile values for total HC, CO, $CO_2$ and, where applicable, $CH_3$, OH, HCHO, NMHC and $CH_4$ (in accordance with 40 CFR 86.08426(a)(6)(iii) or 40 CFR 86.1837-01). Also there are tests for fuel specific gravity, carbon weight fraction, net heating value, and additionally for natural gas. For gasoline-fueled automobiles, the fuel economy in miles per gallon is to be calculated using the following equation:

$$mpg=(5174 \times 10\backslash 4\backslash \times CWF \times SG)/[((CWF \times HC)+(0.429 \times CO)+(0.273 \times CO2)) \times ((0.6 \times SG \times NHV)+5471)]$$

Similar calculations are used for diesel-fueled automobiles, methanol-fueled automobiles, automobiles designed to operate on mixtures of fuels, and automobiles designed to operate on natural gas fuels.

According to the Office of Transportation and Air Quality, the EPA "Inventory of U.S. Greenhouse Gas Emissions and Sinks", and EPA Publication EPA420-F-05-001 February 2005, there is an estimated $CO_2$ emissions from fuel, from the heat content of the fuel, and carbon content coefficients in terms of carbon content per quadrillion BTU (QBTU), using Energy Information Administration data. The estimates are based only on average carbon content of conventional gasoline and diesel fuels and do not address the impact of fuel additives. The Intergovernmental Panel on Climate Change (IPCC) calculations require an oxidation factor be applied to the carbon content to account for the small portion of fuel that is not oxidized into $CO_2$. All oil and oil products, the oxidation factor used is 0.99, that is, the factor is used as assuming 99% of carbon in the fuel is eventually oxidized. Therefore, the $CO_2$ emissions for the above mentioned fuels is calculated:

$CO_2$ emissions from a gallon of gasoline: 2,421 g×0.99×(44/12)=8,788 g=8.8 kg/gallon=19.4 pounds/gallon $CO_2$ emissions from a gallon of diesel=2,778 g×0.99× (44/12)=10,084 g=10.1 kg/gallon=22.2 pounds/ gallon In 1990, the U.S. Environmental Protection Agency (EPA) estimated that the average sulfur content of on-highway diesel fuel is approximately 0.25% by weight and required this level be reduced to no more than 0.05% by weight by Oct. 1, 1993. The EPA also required that this diesel fuel have a minimum cetane index specification of 40 (or meet a maximum aromatics level of 35%). The objective of this rule was to reduce sulfate particulate and carbonaceous and organic particulate emissions (Federal Register, Vol. 55, No. 162, Aug. 21, 1990, pp. 34120-34151). Diesel fuel natural impurities and chemical composition can damage operation of emission control devices and increase pollutant formation in the atmosphere. The U.S. Environmental Protection Agency established low sulfur requirements in diesel fuel beginning in 2006. (EPA420-F-05-029, July 2000). Low-sulfur diesel fuels and technology for meeting these emission were not commercially implemented, however the U.S. Environmental Protection Agency and its Smartway Program recognized exemplary trucking companies on Oct. 30, 2006 American Trucking Association Annual Conference in Grapevine, Texas for improving aerodynamics and exhaust after-treatment devices which can reduce fleet fuel consumption, fuel costs and help reduce $CO_2$ emissions pollution. Also, in 1998, the California Air Resources Board (CARB) declared all light trucks, some mini-vans, and all diesel-powered vehicles must meet the same standard beginning in 2004. The diesel manufacturers improved fuel economy gains but did not meet the more stringent tailpipe standards. (L. Brooke, Automotive Industries, December 1998; Gale Group 2000)

The EPA states that another way to calculate the greenhouse gas impact of each vehicle includes full fuel life cycle estimates, that is to consider all the steps in the creation, consumption of fuel, from production and refining to distribution and final use (US EPA Green Vehicle Guide). Another group that specifies, reports and trades with industrial 15 applications that involve gases is based on the Kyoto Protocol which opened a market based solution for climate change mitigation that includes carbon dioxide emission trading. Some countries are passive to trading energy and forestry commodities ("Carbon dioxide emission trading, or not? An institutional analysis of company behaviour in Sweden", Corporate Social Responsibility and Environmental Management, Wiley, Volume 11, Issue 4, pages 211-221, December 2004, article first published online 16 Nov. 2004).

Discussions have been published for reducing emissions of $CO_2$ represents an essentially permanent benefit for the atmosphere while capturing $CO_2$ that is produced represents the future challenge of storing and risk of escape to the atmosphere or marketing a dubious output. (G. Marland "Trading permanent and temporary carbon emission credits, Abstract, Journal of Earth and Environmental Science.) Conditions for optimizing combined cooling, heating, and operational costs of power systems generally focuses only on energy cost. (H. Cho, Evaluation of CCHP systems performance based on operational cost, primary energy consumption, and carbon dioxide emission by utilizing an optimal operation scheme, Dept. of Mechanical Engr. Mississippi State University, Elsevier, available online 13 May 2009)

U.S. Pat. No. 5,376,154 discloses low-sulfur diesel fuels containing organometallic complexes related to low-sulfur diesel fuels for diesels equipped the exhaust traps. Generally temperatures of approximately 450-600° C. are required for exhaust temperatures to prevent an accumulation of carbon black and plugs in the traps.

Many examples of organometallic complexes derived from variations of combinations including aromatics, aldehdyes, ketones, amines, and thiol-containing aromatics are cited, and occur at lower temperatures than the heated traps. It also has been suggested that the particle build-up in the traps can be controlled by lowering the ignition temperature of the particulates so that the particles begin burning at the lowest possible temperatures. One method of lowering the ignition temperature involves the addition of a combustion improver to the exhaust particulate, and the most practical way to effect the addition of the combustion improver to the exhaust particulate is by adding the combustion improver to the fuel. Copper compounds have been suggested as combustion improvers for fuels including diesel fuels.

U.S. Pat. No. 6,858,047 discloses a fuel additive for gasoline and diesel engines, which includes lithium didodecylbenzenesulfonate, t-butyl perbenzoate, and methyl ethyl ketone peroxide in a solvent such as diphenyl for an aesthetically pleasing product and for better mileage for internal combustion engines.

U.S. Pat. No. 5,023,016 discloses a concentrate composition comprising (a) a blend of (i) a metal sulfonate and (ii) an alkali or alkaline earth metal or zinc salt of a carboxylic acid and (b) a carrier. The composition is useful as a rust- and corrosion-inhibitor in a petroleum or synthetic base medium and is capable of maintaining metal sulfonate content at temperatures greater than 150° C., e.g., 200° C., for 20 hours. Sodium, potassium, alkali metal salts of difunctional arylsulfonic acids have been used as fuel additives.

U.S. Pat. Appl. US2007/025355 A1 discloses many compositions for fuel additives and the inventor reports vehicle emissions data as fuel economy mileage measurements.

U.S. Pat. No. 4,002,558 discloses the use of inorganic halides to reduce undesirable haze or emulsion in distillate fuels and in diesel fuels due to slight traces of water.

International Publication No. WO 03/040269A I discloses a wide variety of compounds and metals that may be considered combustion enhancers to be placed in solvents and added to most fuel types, as defined by the authors.

U.S. Pat. No. 4,612,880 discloses a method of operating an internal combustion engine by introducing an additive, which inhibits the formation of engine deposits by addition of an oil soluble cyclopentadienyl iron compound, which is stable and available, and carboxylic acids/esters, which are free of heteroatoms. The manifold and/or combustion surfaces have a combined thermal conductance and thermal penetration allowing the surface temperatures to be higher than those temperatures at which deposits form (about 400° C. and above) and simultaneously storing or generating insufficient heat during the next repeated process.

SUMMARY OF THE INVENTION

The present invention includes an improvement to a combustion engine by way of a lithium conditioned chamber for producing reduced carbon oxide engine emissions.

Preferably, the lithium conditioned chamber is formed by combusting a hydrocarbon fuel containing a lithium salt in the chamber.

The present invention provides for a method of combusting a hydrocarbon fuel combusting a hydrocarbon fuel containing a lithium salt in a hydrocarbon powered engine to produce a lithium conditioned chamber in the engine, and combusting a lithium free hydrocarbon fuel in the conditioned chamber in order to produce a low concentration effluent gas. The low concentration effluent gas has a lower concentration of carbon oxides than an effluent gas from an engine without a conditioned chamber combusting the same lithium free hydrocarbon fuel.

Thus, an objective of this invention is to provide a novel addition of lithium nitrate to gasoline powered vehicles and diesel powered vehicles to show internal engine condition or surface alteration due to the combustion process with the presence of lithium nitrate.

An objective of the present invention is to provide a method of conditioning the internal combustion surface of an engine of a gasoline or diesel powered vehicle by combusting a hydrocarbon fuel, including lithium nitrate, to obtain an engine capable of providing an emission gas having a lower concentration of carbon oxides than obtained by combusting a hydrocarbon fuel under similar conditions in an engine not having lithium conditioned surface.

An objective of the present invention provides a method of conditioning the internal combustion surface of an engine of a diesel powered vehicle by combusting a hydrocarbon fuel, including lithium nitrate, to obtain an engine capable of providing an emission gas having a lower concentration of carbon oxides and a lower concentration of hydrocarbons than obtained by combusting a hydrocarbon fuel under similar conditions in an engine not having a lithium conditioned surface.

An objective of the present invention provides a method of conditioning the internal combustion engine chambers of a gasoline or diesel powered vehicle by combusting a hydrocarbon fuel, including lithium nitrate, to obtain an engine capable of providing an emission gas having a lower concentration of carbon oxides than obtained by combusting a hydrocarbon fuel under similar conditions in an engine not having a lithium conditioned engine chamber.

This invention provides a method of combusting a hydrocarbon fuel in the presence of a lithium salt to obtain a vehicle engine effluent having a reduced carbon oxide emission.

This invention provides a method of combusting diesel fuel containing a lithium salt to provide a lithium conditioned surface, wherein the effluent emission gas contains a lower concentration of carbon oxides and a lower concentration of $C_6+$ alkanes than combusting said fuel under similar conditions in an engine not having a lithium conditioned surface.

BRIEF DESCRIPTION OF DRAWINGS

The advantages and features of the present invention will be better understood by the following description when considered in conjunction with the accompanying drawings in which:

FIG. 1 is a partial cross section of an internal combustion engine in accordance with the present invention.

DETAILED DESCRIPTION

Shown in FIG. 1 is an example of a spark ignited internal combustion engine 1 wherein internal combustion surfaces are conditioned by the presence of a lithium salt. The engine generally includes a cylinder block 2 and a cylinder head 3 joined to the upper face of cylinder block 2, and a combustion chamber 5 is formed between the lower face of the cylinder head 3 and the upper face of a piston 4 that fitted in a cylinder bore 6.

A pair of spark plugs 7 are screwed into the cylinder head 3, having tips facing the combustion chamber 5. The chamber 5 is conditioned by the presence of lithium salt for reduced carbon oxide emissions. An intake valve hole 8 is formed in the lower face of cylinder head 3, and an intake port 9 extending from the intake valve hole 8 runs through the interior of the cylinder head 3, and opens on one side while the intake valve 10 includes a stem II and a head 12. An exhaust valve 13 head 14 is seated on the exhaust hole 15 at the lower end of the exhaust passage 21 and the combustion chamber 5 therefore communicates with the exhaust port 16.

Conditioning of the chamber 5 in accordance with the present invention is represented by a layer 18. However, this representation is not to be considered limiting to the present invention. The actual conditioning may be considered as surface treatment, which may or may not be in the form of a layer.

It follows that the present invention includes a method wherein the internal surfaces exposed to combustion processes of hydrocarbon fuel powered systems are conditioned by lithium nitrate to enhance the efficiency of the combustion process, wherein said method comprises providing lithium nitrate dissolved in a hydrocarbon fuel to said hydrocarbon fuel powered system and combusting said hydrocarbon fuels Example #1 and Example #2.

The fuels contemplated for use in the present invention are in the following standards which include hydrocarbon fuels such as gasoline, diesel fuel, biodiesel fuels, and fuels blended or containing alcohols and are described in the following ASTM specifications. The fuels contemplated for use in the present invention are typically liquid hydrocarbon fuels in the gasoline boiling range. Gasoline fuels are supplied in grades and designations defined by the American Society of Testing and Management, ASTM D396-09a Specification for Fuel Oils, while ASTM D4814 Standard Specification for Automotive Spark-Ignition Engine Fuel defines fuel hydrocarbon compositions and blends with oxygenates. Motor gasoline typically have boiling ranges within 70-450° F. while aviation gasoline typically have boiling ranges within 100-300° F. Specifications used to define fuel-alcohol blends include ASTM D5798 for Fuel Ethanol and ASTM D4797 for Fuel Methanol. The ASTM D975-10a Specification for Diesel Fuel Oils defines petroleum distillate grades, biodiesel, fuel oils, and sulfur content is incorporated by reference. The requirements specified for diesel fuel oils are determined in accordance with the following test methods: flash point; cloud point; water and sediment; carbon residue; ash; distillation; viscosity; sulfur; copper corrosion; cetane number; cetane index; aromaticity; lubricity; and conductivity The ASTM D7467-08 Specification for Diesel Fuel Oil, Biodiesel Blend is a newer specification defining blends of fuel for on-and-off road vehicles.

Combustion products of hydrocarbon fuel (defined as mol % concentrations) in an engine before the effluent emissions are altered by the hydrocarbon fuel engine emissions systems are measured by collecting vehicle emission gas samples in a stainless steel pipe before the catalytic converter. Vehicles were run 4 hours per fuel tank with an estimated gas collection temperature 300-400° C.

The exact method used and specified by the Gas Processors Association Publication, "Analysis for Natural Gas & Similar Gaseous Mixtures by Gas Chromatography" #2261 is incorporated by reference. A Perkin Elmer Thermal Conductivity Detector (TCD) and Gas Chromatograph (GC) with a 15 M GC capillary column was used for separation of effluent gas components.

The invention is directed to a fuel additive lithium nitrate prepared by the method of preparing a 0.1 M solution $LiNO_3$ in isopropanol. The solution is prepared by weighing dry 7.0 g $LiNO_3$ to 1 L isopropanol for 0.1M solution. Then 1 ml solution is added to 7 kilograms fuel to obtain 1 microgram $LiNO_3$ in fuel. The fuel density is approximately 6.1 to 6.3 lb/gal.

A total sample intake of 10-13 ppm $LiNO_3$ was used for each vehicle example studied and reported. Approximately 10-13 ppm $LiNO_3$ per vehicle fuel tank for each measurement with a variation +/−1-2 gallons fuel per test.

EXAMPLE #1

|  | Mol % Analysis | Second Measurement |
|---|---|---|
| #1 Dodge Truck Baseline | | |
| $C_6+$ | .071 | |
| $CO_2$ | 5.340 | |
| $N_2$ | 94.589 | |
| Btu Dry | 3.6 | |
| Btu Sat | 3.6 | |
| #1 Dodge Truck | | |
| $C_6+$ | .357 | .246 |
| $CO_2$ | .363 | 3.332 |
| $N_2$ | 99.280 | 96.422 |
| Btu Dry | 18.3 | 12.6 |
| Btu Sat | 18.0 | 12.4 |

Note:
Baseline samples refer to fuel only
Note:
Samples include LiNO3 added to fuel at 10-13 ppm/vehicle fuel tank As shown, the use of Li in a gasoline-powered engine in accordance with the method of this invention provides a combustion effluent gas having a reduced carbon dioxide concentration.

|  | Mol % Analysis | Second Measurement |
|---|---|---|
| #2 Dodge Truck Baseline | | |
| $C_6+$ | .063 | |
| $CO_2$ | 5.423 | |
| $N_2$ | 94.514 | |
| Btu Dry | 3.2 | |
| Btu Sat | 3.2 | |
| #2 Dodge Truck | | |
| $C_6+$ | .286 | .227 |
| $CO_2$ | 2.552 | 3.321 |
| N2 | 97.162 | 96.452 |
| Btu Dry | 14.7 | 11.6 |
| Btu Sat | 14.4 | 11.4 |

As shown, the use of Li in a gasoline-powered engine in accordance with the method of this invention provides a combustion effluent gas having a reduced carbon dioxide concentration.

EXAMPLE #2

|  | Mol % Analysis | Second Measurement |
|---|---|---|
| Diesel Tractor Baseline | | |
| $C_6+$ | .017 | |
| $CO_2$ | .308 | |
| $N_2$ | 99.675 | |
| Btu Dry | .9 | |
| Btu Sat | .9 | |
| Diesel Tractor #1 | | |
| $C_6+$ | .007 | .000 |
| $CO_2$ | .110 | 1.242 (leak) |
| N2 | 99.883 | 99.758 |
| Btu Dry | .4 | .0 |
| Btu Sat | .4 | .0 |
| Diesel Tractor #2 | | |
| $C_6+$ | .000 | |
| $CO_2$ | .075 | |
| N2 | 99.925 | |
| Btu Dry | .0 | |
| Btu Sat | .0 | |

Note:
Baseline samples refer to fuel only
Note:
Samples include LiNO3 added to fuel at 10-13 ppm/vehicle fuel tank As shown, the use of Li in a diesel-powered engine in accordance with the method of this invention provides a combustion effluent gas having a reduced carbon dioxide concentration and a reduced hexane concentration.

Trends in Data

The increase in the $C_6+$ hexanes measurements indicate incomplete combustion of larger alkanes and other compounds which the TCD detector verifies as a Btu measurement of that combustion product.

Gasoline Powered Vehicles

Data collected by this method indicates mole % analyses for Dodge trucks using hydrocarbon based fuel to be approximately 5% $CO_2$ without the presence of $LiNO_3$ and reduced to approximately 3% or less $CO_2$ with the presence of $LiNO_3$.

Data collected by this method indicates mole % analyses for Dodge trucks using hydrocarbon-based fuel to be approximately 0.07% $C_6+$ hexanes without the presence of $LiNO_3$ and roughly increased by factors of 3-5 with the presence of $LiNO_3$.

The results from Example #1 indicate the presence of $LiNO_3$ alters the combustion of the gasoline hydrocarbon fuel in an engine. These results indicate an internal surface conditioned by combusting a hydrocarbon fuel containing a lithium salt provides a lithium conditioned surface, wherein the effluent gas has a lower concentration of carbon oxides than combusting said fuel under similar conditions in an engine not having a lithium conditioned surface. Thereafter, the lithium conditioned internal surface in contact with combusting hydrocarbon fuel provides an effluent gas wherein the effluent gas has a lower concentration of carbon oxides than combusting said hydrocarbon fuel under similar conditions in an engine not having a lithium conditioned surface.

Diesel Powered Vehicles

Data collected by this method indicates mole % analyses for diesel trucks using diesel hydrocarbon based fuel to be approximately 0.3% $CO_2$ without the presence of $LiNO_3$ and reduced to approximately 0.1% or less $CO_2$ with the presence of $LiNO_3$.

Data collected by this method indicates mole % analyses for diesel trucks using diesel hydrocarbon based fuel to be approximately 0.017% $C_6+$ hexanes without the presence of $LiNO_3$ and decreased with the presence of $LiNO_3$.

The results from Example #2 indicate the presence of $LiNO_3$ alters the combustion of the diesel hydrocarbon fuel in a diesel engine. These results indicate an internal surface conditioned by combusting a hydrocarbon fuel containing a lithium salt provides a lithium conditioned surface, wherein the effluent gas has a lower mol % concentration of carbon oxides and lower mol % concentration of $C_6+$ alkanes than combusting said diesel hydrocarbon fuel under similar conditions in an engine not having a lithium conditioned surface.

Thereafter, the lithium conditioned internal surface in contact with combusting diesel fuel provides an effluent gas wherein the effluent gas has a lower mol % concentration of carbon oxides and a lower mol % concentration of $C_6+$ alkanes than combusting said diesel fuel under similar conditions in an engine not having a lithium conditioned surface.

Although there has been hereinabove described a specific lithium conditioned engine for reduced carbon dioxide emissions in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

I claim:

1. A method of combusting a hydrocarbon fuel, said method comprising:
   combusting a hydrocarbon fuel containing a 10-13 ppm lithium salt in a hydrocarbon powered engine to produce lithium conditioned combustion chamber in the engine; and
   subsequently combusting a lithium free hydrocarbon fuel in the conditioned combustion chamber so as to produce a low concentration effluent gas, said low concentration effluent gas having a lower concentration of carbon dioxide than an effluent gas from said same engine without a conditioned chamber combusting the same hydrocarbon fuel free of lithium.

2. The method according to claim 1 where said hydrocarbon fuel and lithium free hydrocarbon fuel are diesel fuel, said low concentration effluent gas having a lower concentration of carbon dioxide and a lower concentration of alkanes than an effluent gas from an engine without a conditioned chamber combusting the hydrocarbon fuel free of lithium.

3. The method according to claim 1 wherein said hydrocarbon fuel is selected from the group consisting of gasoline, diesel fuel, biodiesel, and fuel-alcohol mixtures.

4. The method according to claim 3 wherein said lithium salt comprises 0.1 M to 0.01 M of lithium nitrate in said fuel-alcohol mixture, said alcohol comprising isopropanol.

5. A method of conditioning internal surfaces exposed to combustion in an engine of a gasoline or diesel powered vehicle by combusting therein a hydrocarbon fuel containing lithium nitrate dissolved therein to produce lithium conditioned engine surfaces, said engine with lithium conditioned surfaces, when subsequently burning a lithium free fuel, providing an emission gas having a lower concentration of carbon dioxide than obtained by combusting a hydrocarbon fuel under similar conditions in said engine prior to producing the lithium conditioned surfaces.

6. A method according to claim 5 in which conditioning the internal combustion surfaces of a diesel engine provides an emission gas having a lower concentration of carbon dioxides and a lower concentration of alkanes than obtained by combusting a diesel fuel under similar conditions in said engine prior to forming lithium conditioned surfaces.

\* \* \* \* \*